United States Patent Office 3,116,226
Patented Dec. 31, 1963

3,116,226
IRRADIATION OF FLUOROCARBON
COPOLYMERS
George Henry Bowers III, Wilmington, Del., assignor to
E. I. du Pont de Nemours and Company, Wilmington,
Del., a corporation of Delaware
No Drawing. Filed Mar. 16, 1959, Ser. No. 799,406
10 Claims. (Cl. 204—154)

This invention relates to a process for modifying fluorocarbon polymers to increase their strength, dimensional stability and resistance to solvents, particularly at temperatures above the crystalline melting points of the fluorocarbon polymers, and to the improved products obtained thereby. The invention further relates to a process for improving the fabricability of fluorocarbon polymers. More particularly, this invention relates to a process for increasing the molecular weight of fluorocarbon polymers as measured by melt viscosity through high energy radiation and to the products obtained thereby.

It has been well known for a number of years that polymeric substances are modified when subjected to bombardment with high energy, ionizing radiation including accelerated charged particles, such as electrons and protons and particles emitted by nuclear fission. In general, irradiation of polymeric materials has resulted in two types of substantially different products. Some high polymers, such as polyethylene, polybutadiene, natural rubber, polycarbonamides and polyesters, undergo molecular combination and eventually become cross-linked. A second class of polymers, including halocarbon and fluorocarbon polymers, are known to undergo polymer degradation when subjected to high energy, ionizing radiation.

Thus polyvinylidene chloride, polychlorotrifluoroethylene and polytetrafluoroethylene are known to degrade substantially and form low molecular weight products when subjected to such radiation. The degradation of the polymer, characterized by a decrease in melt viscosity of the polymer, adversely affects such important mechanical properties as toughness, tensile strength and elongation. In view of the high thermal stability and corrosion resistance of fluorocarbon polymers, it would be highly desirable to cross-link fluorocarbon polymers in order to improve their mechanical properties at elevated temperatures. Due to the fact that most fluorocarbon polymers are thermoplastic in nature, these properties decrease with increasing temperatures. Such an improvement in high temperature properties could be obtained if the material could be cross-linked.

It is therefore one of the objects of the present invention to provide a process for the preparation of cross-linked fluorocarbon polymers having improved mechanical properties, particularly at elevated temperatures. It is another object of the present invention to provide a process for cross-linking fluorocarbon polymers through irradiation. Still another object of the present invention is to prepare fluorocarbon polymers of improved fabricability. Other objects will become apparent hereinafter.

In accordance with the present invention, it was discovered that cross-linked polymers of increased molecular weight, compared to the base polymers, can be obtained from fluorocarbon copolymers of the class consisting of copolymers of tetrafluoroethylene and fluoroolefins having the general structure $CF_2=CXC_nF_{2n}Y$ and

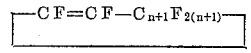

where $n$ is an integer of 1 and above, X is of the class consisting of fluorine and perfluoroalkyl radicals, and Y is of the class consisting of hydrogen and fluorine, by a process which comprises subjecting said fluorocarbon polymer to high energy, ionizing radiation at a temperature above the glassy state transition temperature of the polymer, but below the thermal decomposition temperature of the polymer.

Contrary to the behavior of fluorocarbon homopolymers, such as polytetrafluoroethylene and polyhexafluoropropylene, it was found that fluorocarbon copolymers of tetrafluoroethylene and such comonomers as hexafluoropropylene, become cross-linked when subjected to high energy, ionizing radiation. However, it is essential that the irradiation of the fluorocarbon copolymer be carried out at the temperatures indicated. Irradiation of the copolymer below its glassy state transition temperature results in degradation. The copolymers which undergo this cross-linking reaction are copolymers of tetrafluoroethylene and substituted, terminally unsaturated perfluoroolefins or omega-hydroperfluoroolefins. Thus, copolymers of tetrafluoroethylene with such comonomers as hexafluoropropylene, perfluorobutene-1, perfluoropentene-1, perfluorohexene-1, perfluoroisobutylene, perfluorodecene-1, omega-hydroperfluorohexene-1, omega-hydroperfluorooctene-1, and perfluorocyclobutene are cross-linkable fluorocarbon copolymers. From the standpoint of cross-linking, the number of carbon atoms and the structure in the radical attached to the double bond of the copolymer are not critical. However, the preparation of copolymers with comonomers having more than 10 carbon atoms in the radical is difficult, and thus, the preferred fluorocarbon copolymers employed in the process of the present invention are those in which comonomer has less than 12 carbon atoms in the molecule. More than one comonomer of the class defined may be employed to form cross-linkable copolymers. The quantity of the comonomer in the copolymer may be greatly varied and has not been found to be critical. In general, copolymers are employed which contain from 0.2 to 50 mol percent of the comonomer in the copolymer.

The radiation which is employed in the practice of this invention comprises high energy, ionizing radiation. "High energy" means that it is of sufficient energy to penetrate an organic substance and produce ionization therein. The particular energy level employed will depend upon such considerations as the most economical source available and the thickness of material which it is desired to treat. The radiation generally consists of a beam of high energy particles, such as electrons, protons, neutrons, deuterons α-particles and β-particles. The source of these high energy particles may be a radioactive element which is undergoing nuclear fission as in an atomic pile. More conveniently, it may be a particle accelerator wherein charged particles are accelerated to high energies of the order of 100,000 electron volts and higher, but most suitably between about 500,000 and 4,000,000 electron volts, by means of a suitable voltage gradient such as a resonant transformer electron accelerator, a Van de Graaff electron generator, a betatron, a synchrotron, a cyclotron and the like. Neutron radiation may be produced by bombardment of selected light metal (e.g., beryllium) targets with high energy positive particles.

The average penetration of high energy electrons in matter is roughly proportional to their energy and inversely proportional to the density of the matter, with small correction factors for the atomic number of the absorbing material. A beam of 1 mev. electrons will penetrate to about 0.5 cm. in matter of unit density. If it is desired to treat samples much thicker than the range of penetration of the available ionizing particle radiation, a beam of high energy (short wavelength) electromagnetic radiation which has a relatively high penetrating power can be used to generate high energy particle radiation within the sample. It is known that when X-rays or gamma-rays of wavelength $\lambda$, or frequency $\nu$ (where $$\nu = \frac{c}{\lambda}$$

$c$ being the velocity of light) are absorbed by matter, the electrons which absorb this radiation may be ejected from matter with a high velocity by photoelectric or by Compton scattering processes. The maximum velocity, $v$ of these electrons from radiation of a frequency $\nu$ is given by the well-known equation $h = \frac{1}{2}mv^2$, where $h =$ Planck's constant and $m$ is the mass of the electron.

The Van de Graaff electron generator provides a particularly convenient source of a beam of accelerated electrons of controllable voltage and current, and has, therefore, primarily been employed in the examples described below to illustrate the subject invention without any purpose to limit the invention either to this type of high energy particle or to the Van de Graaff generator as the source of electrons.

The high energy particles penetrate the polymer to a limited depth which is dependent upon the particular energy level of the electrons employed and upon the density of the irradiated polymer. Generally, if it is desired to assure passage of the electrons all the way through the sample, it is preferable to employ electrons having energies in the range of 500,000 to 4,000,000 electron volts and polymer samples which have a thickness which will give 0.2 to 2.0 grams of material per sq. cm. of surface bombarded by the electrons; thicker samples can be treated by irradiating opposite surfaces in subsequent passes. It is sometimes desirable when using high energy electron beams to limit the thickness of samples to somewhat lower values, and put a thin metal (e.g., iron or copper) shield (say 2–10 mils thickness with 2 mev. electrons) between the sample and the high energy source. This slows down some of the electrons and changes the velocity distribution of the beam to give a more uniform radiation dose near the upper surface of the polymer. In some cases, where it is desired to produce an article with an unmodified interior encrusted in a cross-linked shell, there is no need for limiting the thickness of the sample treated to the thickness penetrated by the high energy, ionizing radiation employed.

A convenient method for practicing the invention is to conduct the fluorocarbon copolymer in the form of shaped articles such as film, sheet, fiber, coated wire, hollow tube, or other shape, at a constant rate continuously through a beam of high energy, ionizing radiation, as hereinabove described. In most instances, the window of the radiation source is maintained at about 10 cm. from the specimen undergoing treatment, but this distance is not critical. The radiation energy imparted to the copolymer is measured in rads which corresponds to 100 ergs per g. of the copolymer. Employing a 2 mev. electron beam from a Van de Graaff accelerator at an intensity of 250 microamperes and at a distance of 10 centimeters from the window, a sample will be exposed to $10^6$ rads, if each point in the polymer is subjected to an exposure time of one second. A one second exposure can, of course, be obtained by coordinating the rate of exposure with the width of the beam.

The total radiation of such a beam will be 12.5 watt-sec./cm.$^2$. This exposure of 12.5 watt sec./cm.$^2$ is also defined for the purposes of the following examples as a "standard pass." The amount of radiation may be readily varied by the number of passes, the beam current and the beam area, as is known to those skilled in the art.

Although a number of test methods may be employed to measure the degree of cross-linking or increase in molecular weight, a preferred method, and the one employed in the examples comprises the measurement of the melt viscosity of the polymer. As indicated by the name, "melt viscosity" measures quantitatively the flow of the copolymer at some temperature above the melting point. It is a relative measure of molecular weight and thus provides a good indication of the degree of cross-linking. By the term "specific melt viscosity," as used herein, is meant the apparent melt viscosity as measured at 380° C. under a shear stress of 6.5 pounds per square inch. The values herein referred to are determined by using a melt indexer of the type described in American Society of Testing Materials, test D-1238-52T, modified for corrosion-resistance to embody a cylinder and orifice of Ampco aluminum bronze and a piston weighing 10 g. having a Stellite cobalt-chromium-tungsten alloy tip. The copolymer, non-irradiated or irradiated, is charged to the 0.375 inch I.D. cylinder which is held at 380° C.±0.5° C., allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute.

The temperature above which cross-linking, rather than degradation, occurs is the glassy state transition temperature of the fluorocarbon polymer which can be determined by methods known in the art. In general, the irradiation is carried out at a temperature above 80° C. and preferably at a temperature above 150° C. As the irradiation temperature is increased, it is generally observed that the rate at which the polymer becomes cross-linked is increased. The upper temperature limit at which irradiaiton is carried out is given by the thermal decomposition temperature of the fluorocarbon polymer. In general, temperatures above 400° C. are not employed not only because of the decomposition occurring, but also of the mechanical difficulties arising when irradiation at these temperatures is attempted.

The process of the present invention gives rise to two distinct types of product depending on the amount of radiation imparted to the polymer. At low exposures only a small increase in melt viscosity is obtained, caused principally by a substantial change in the molecular weight distribution of the fluorocarbon copolymer. The major benefit derived from low exposure irradiation is an improvement in the fabricability of the irradiated polymer as compared to a polymer directly synthesized to the same melt viscosity. In general, the irradiation dose employed is less than $2 \times 10^6$ rads and the melt viscosity increase is generally less than 100 fold the original melt viscosity. A minimum radiation dose of $1 \times 10^4$ rads is required to obtain a significant increase in melt viscosity. High exposure or massive irradiation occurs when the fluorocarbon polymer is subjected to a radiation dose of greater than $2 \times 10^6$ rads. The massively irradiated fluorocarbon polymer, when subjected to the specific melt viscosity test, shows no significant melt flow after 30 minutes and is considered a "no-flow" fluorocarbon polymer. Irradiation beyond the no-flow stage causes further cross-linking of the fluorocarbon copolymers, and may be advantageously used to obtain further improvements in physical properties of the cross-linked polymer.

The invention is further illustrated by the following examples:

EXAMPLE I

A copolymer of tetrafluoroethylene and hexafluoropropylene containing 11.2 mol percent of hexafluoropropylene was compression molded into 6 in. by 6 in. sheets, 120 mils in thickness. The sheets were, one at a time, placed into an oven comprising a steel container having an open top heated from the bottom by a temperature-controlled hot plate. The top was covered with 1 mil aluminum foil and ¼ inch "Fiberglas" insulation. The air in the oven was preheated to the desired temperature prior to entry into the oven. The fluorocarbon polymer sheet was given 15 minutes to come to the temperature of the oven, maintained at 300° C., and the assembly was then placed on a moving table and passed under the high energy electron beam provided by a Van de Graaff electron generator operating at 2 million electron volts and 250 microamperes current. The sample was subjected to the radiation indicated in Table I and as defined hereinabove. The specific melt viscosity of the irradiated sample was measured by the method described hereinabove and compared to the specific melt viscosity of an untreated sample.

*Table I*

| Sample | Radiation Dose in Rads | Specific Melt Viscosity in Poises×$10^{-4}$ |
| --- | --- | --- |
| A | 0 | 7.7 |
| B | $1\times10^4$ | 7.5 |
| C | $1\times10^5$ | 10.8 |
| D | $1\times10^6$ | 201 |
| E | $1\times10^7$ | No flow |

It should be noted that the reproducibility of the melt viscosity is ±5% and thus irradiation of the copolymer with $10^4$ rads did not significantly change the structure of the polymer. Polymer subjected to $10^7$ rads could be deformed at temperatures above the melting point of the linear polymer but recovered its original shape, characteristic of a cross-linked thermoplastic polymer wherein the cross-linked molecules are of high molecular weight.

EXAMPLE II

Using the procedure described in Example I, a copolymer of tetrafluoroethylene and hexafluoropropylene containing 11.2 mol percent of hexafluoropropylene was irradiated at the temperature and in the atmosphere indicated in Table II. The specific melt viscosity of the irradiated sample was measured and is compared to that of the starting material. The room temperature yield strength and yield elongation of the irradiated copolymer is also compared. Yield strength and elongation were determined by ASTM D–1457–56T.

*Table II*

| Sample | Irradiation Temp. in ° C. | Irradiation Dose in Rads × $10^{-6}$ | Irradiation Atmosphere | Specific Melt Viscosity in Poises × $10^{-4}$ | Yield Strength, p.s.i. | Yield Elongation in Percent |
| --- | --- | --- | --- | --- | --- | --- |
| A | | | | 7.2 | 1,930 | 8.8 |
| B | 25 | 1 | air | 7.4 | 1,930 | 9.3 |
| C | 150 | 1 | do | 15 | 1,980 | 8.8 |
| D | 200 | 1 | do | 20 | 1,910 | 7.1 |
| E | 250 | 1 | do | 46 | 1,920 | 9.2 |
| F | 300 | 1 | do | 62 | 1,950 | 8.6 |
| G | 350 | 1 | do | 56 | 1,940 | 8.5 |
| H | 250 | 3 | do | no flow | 2,120 | 6.6 |
| I | 250 | 6 | do | no flow | 2,180 | 6.5 |
| J | 250 | 0.1 | nitrogen | 8.4 | 1,940 | 9.3 |
| K | 250 | 1 | do | 62.9 | 1,950 | 8.9 |
| L | 250 | 10 | do | no flow | 2,226 | 6.2 |
| M | 250 | 100 | do | no flow | 3,430 | 5.2 |

The table shows the effect of radiation temperature on the degree of cross-linking obtained with the same amount of irradiation, and, furthermore, shows the effect of irradiation beyond the no-flow stage indicating additional improvement. As can be seen, the mechanical properties of the copolymer are improved by irradiation. The effect becomes increasingly pronounced when the same properties are tested at elevated temperature.

EXAMPLE III

This example demonstrates the improved fabricability and stability of partially cross-linked fluorocarbon copolymers. Into a ram-type injection molding machine with a vertical barrel maintained at a temperature of 390° C., was charged the fluorocarbon copolymer of tetrafluoroethylene and hexafluoropropylene indicated in Table III. The polymer was charged to the barrel and injection molded into a mold having an 11/16 in. by 5/16 in. by 0.049 in. mold cavity. The minimum mold temperature necessary to obtain an acceptable molding was determined. An acceptable molding is determined by the appearance of the molded piece and by its ability to withstand ten 180° bends without delamination. The history of the irradiation samples is also shown in Table III. The copolymer was irradiated by the procedure described in Example I at a temperature of 200° C. for sample B, and 300° C. for sample D.

*Table III*

| Copolymer | Specific Melt Viscosity in Poises × $10^{-4}$ | Irradiated Dose in Rads | Specific Melt Viscosity in Poises × $10^{-4}$ (Irradiation Copolymer) | Minimum Mold Temp., ° C. |
| --- | --- | --- | --- | --- |
| A | 7.2 | | | 220 |
| B | 7.2 | $1\times10^6$ | 28 | 242 |
| C | 10 | | | 242 |
| D | 7.2 | $1\times10^6$ | 62 | 256 |
| E | 69 | | | [1] >280 |

[1] Not injection moldable.

The minimum molding temperature required for the various copolymers in relation to the melt viscosity of the copolymer demonstrates the fabricability of the copolymer. Thus, as can be seen from the first three copolymers, the irradiated copolymer has the same minimum mold temperature as a copolymer, directly synthesized, with one third the specific melt viscosity, although the minimum mold temperature is higher than that of the untreated base resin. D and E show the minimum mold temperature of two copolymers of essentially the same melt viscosity, one of which was directly synthesized, the other irradiated after synthesis. The minimum mold temperature could not be accurately determined in the directly synthesized resin, since it was above the melting point of the polymer, at which no acceptable moldings can be made.

EXAMPLE IV

This example illustrates the surprising improvement in high temperature mechanical properties obtained from irradiated copolymers of tetrafluoroethylene and hexafluoropropylene. The copolymer employed contained 11.5 mol percent of hexafluoropropylene and was irradiated as indicated in Table IV, using the procedure of Example I, except that a nitrogen atmosphere was used and that the copolymer was irradiated at a temperature of 250° C. The stress crack resistance of the copolymers illustrated in Table IV was obtained by using six ½ in., 120 mil thick samples, 1½ in. long, which were notched 25 mil in the center and then bent and stuck into a ⅝ in. wide channel. The samples were then placed into an air oven maintained at 240° C. and the time necessary for 50% failure to occur was determined. The test was continued for 1000 hours. None of the cross-linked copolymers showed failure after 1000 hours exposure.

Table IV

| Copolymer | Irradiation Dose in Rads×10⁻⁶ | Specific Melt Viscosity in Poises×10⁻⁴ | Time to 50% Failure in Hours |
|---|---|---|---|
| A | | 7.2 | 4 |
| B | 6 | No flow | >1,000 |
| C | 15 | ----do---- | >1,000 |
| D | 30 | ----do---- | >1,000 |

EXAMPLE V

A copolymer of tetrafluoroethylene and hexafluoropropylene containing 11.2 mol percent of hexafluoropropylene was extruded as a 10 mil coating on 22 gauge wire. The cut-through resistance of irradiated and non-irradiated insulated wire was compared. The cut-through resistance of the insulation to the wire was measured by placing the insulated wire over a 3/32 in. metal mandrel, attaching a 300 g. weight to the wire and measuring the time necessary for the wire to make electrical contact with the metal mandrel. The results described in Table V below were obtained at a temperature of 235 to 245° C. The irradiated copolymer insulation was obtained using the procedure of Example I, except that the irradiation temperature was 250° C. and that the irradiation was carried out in a nitrogen atmosphere. As shown by Table V, the cut-through resistance at elevated temperatures is substantially improved when the copolymer is irradiated.

Table IV

| Copolymer | Irradiation Dose in Rads×10⁻⁶ | Specific Melt Viscosity in Poises×10⁻⁴ | Time to 50% Failure in Hours |
|---|---|---|---|
| A | 0 | 7 | 2.2 |
| B | 1 | 65 | 3.2 |
| C | 6 | No flow | 32 |

EXAMPLE VI

This example illustrates the irradiation behavior of polytetrafluoroethylene, polyhexafluoropropylene and the copolymer of tetrafluoroethylene and hexafluoropropylene. The change in molecular weight of hexafluoropropylene was measured in terms of inherent viscosity determined at 35° C. on a solution of the polymer in Fluorochemical FC–75 (a perfluorinated ether solvent obtainable from Minnesota Mining and Manufacturing Company). A decrease in the inherent viscosity indicates a decrease in the molecular weight as does a decrease in melt viscosity. The irradiation was carried out in an atmosphere of nitrogen for the dose and at the temperature indicated. The procedure described in Example I was employed. The results obtained are shown in Table VI and clearly point out the degradation of the homopolymers, both with respect to molecular weight and physical properties, as well as the increase in molecular weight and substantial maintainance of the physical properties obtained with the copolymer.

Table VI

| Polymer | Irradiation Dose in Rads | Irradiation Temp., °C. | Specific Melt Viscosity in Poises | Inherent Viscosity | Tensile Strength in p.s.i. | Ultimate Elongation[1] in Percent |
|---|---|---|---|---|---|---|
| Polytetrafluoro ethylene | 0 | | No flow | | 3,840 | 460 |
| Do | 1×10⁶ | 250 | 8×10⁸ | | 1,590 | 74 |
| Do | 1×10⁷ | 250 | 5.4×10⁶ | | 1,410 | 1.7 |
| Polyhexafluoro-propylene | 0 | | | 0.39 | | |
| Do | 1×10⁶ | 200 | | 0.24 | | |
| Do | 3×10⁶ | 200 | | 0.16 | | |
| Copolymer of tetrafluoroethylene and hexafluoropropylene | 0 | | 7.2×10⁴ | | 3,320 | 320 |
| Do | 1×10⁶ | 250 | 62.9×10⁴ | | 2,880 | 280 |
| Do | 1×10⁸ | 250 | No flow | | 3,430 | 42 |

[1] Test Method: ASTM D-1457-56T.

EXAMPLE VII

This example demonstrates the irradiation of copolymers of tetrafluoroethylene and hexafluoropropylene having varied hexafluoropropylene contents as stated in Table VII. The irradiation of the copolymers was carried out using the procedure of Example I, except that an atmosphere of nitrogen was employed. The irradiation conditions are stated in the table. The results show that cross-linking is obtained regardless of the comonomer content.

Table VII

| Copolymer | Comonomer Content in mol percent | Irradiation Temp., °C. | Irradiation Dose in Rads | Specific Melt Viscosity in Poises×10⁻⁴ |
|---|---|---|---|---|
| A | 2.9 | | | 28 |
| B | 2.9 | 250 | 1×10⁶ | 96 |
| C | 5.6 | | | 39 |
| D | 5.6 | 250 | 1×10⁶ | 390 |
| E | 15 | | | 1.5 |
| F | 15 | 250 | 1×10⁶ | 20 |
| G | 21 | | | [1] 0.05 |
| H | 21 | 250 | 1×10⁶ | [1] 4.05 |
| I | 11.2 | | | 7.2 |
| J | 11.2 | 250 | 1×10⁶ | 62.9 |

[1] Due to the lower melting point of the copolymer, the melt viscosity was measured at 230° C.

EXAMPLE VIII

This example demonstrates the effect of irradiation on copolymers of tetrafluoroethylene with various comonomers and also the irradiation of polymers and copolymers not completely fluorinated. The irradiation procedure of Example VII was employed. The results obtained are summarized in Table VIII, and show that the increase in molecular weight through irradiation is obtained in tetrafluoroethylene copolymers with comonomers other than hexafluoropropylene and that such increase is not dependent on the structure or number of carbon atoms in the comonomer.

Table VIII

| Polymer | Irradiation Dose in Rads | Irradiation Temp., °C. | Melt Viscosity in Poises ×10⁻⁴ |
|---|---|---|---|
| Copolymer of $CF_2=CF_2$ and $CF_3(CF_2)_4CF=CF_2$ | | | 42.6 |
| Do | $1\times10^6$ | 240 | 66.5 |
| Do | $1\times10^7$ | 240 | 106 |
| Copolymer of $CF_2=CF_2$ and $(CF_3)_2C=CF_2$ | | | 101 |
| Do | $1\times10^6$ | 260–280 | 174 |
| Do | $5\times10^6$ | 260–280 | 286 |
| Copolymer of $CF_2=CF_2$ and $CF_2=CFCl$ | | | ¹ 103 |
| Do | $3\times10^6$ | 250 | ¹ 160 |
| Do | $5\times10^6$ | 250 | ¹ 34.2 |
| Copolymer of $CF_2=CFCl$ and $CF_2=CH_2$ (Kel-F 500) | | | ² 5.8 |
| Do | $1\times10^6$ | 250 | ² 3.1 |
| Do | $3\times10^6$ | 250 | ² 1.3 |
| Homopolymer of $CF_2=CFCl$ (Kel-F 300) | | | ² 102 |
| Do | $1\times10^6$ | 250 | ² 6.7 |
| Do | $1\times10^6$ | 250 | ² 1.4 |
| Copolymer of $CF_2=CF_2$ and 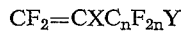 | | | 1.49 |
| Do | $1\times10^7$ | 250 | 3.35 |

¹ measured at 280° C.
² measured at 270° C.
Kel-F is a registered trademark of Minnesota Mining & Mfg. Co.

EXAMPLE IX

A copolymer of tetrafluoroethylene and hexafluoropropylene containing 11.2 mol percent of hexafluoropropylene was irradiated by high flux X-rays. The high flux X-rays were obtained by attaching a water cooled gold target under the Van de Graaff accelerator. The gold target, 13 cm.², was bombarded with 3 mev. electrons at 750 μamps. The sample, in the oven described in Example I, was placed 10 cm. from the target. Under these conditions, the specimen was exposed to 37,500 rads of X-rays per minute. The radiation was carried out at a temperature of 250° C. in a nitrogen atmosphere. The following results were obtained.

Table IX

| Copolymer | Irradiation Dose in Rads | Specific Melt Viscosity in Poises × 10⁻⁴ | Tensile ¹ Strength in p.s.i. | Ultimate¹ Elongation in percent |
|---|---|---|---|---|
| A | 0 | 7.21 | flows | flows |
| B | $1\times10^6$ | 54.5 | | |
| C | $1\times10^7$ | No flow | 14.6 | 44.5 |

¹ Test Method: ASTM-D-1457-56T at 280° C.

This example shows that other forms of high energy, ionizing radiation are suitable in cross-linking the fluorocarbon copolymers employed in the present invention. The table further shows the improvement in mechanical properties obtained by the cross-linked fluorocarbon copolymer at the melting point temperatures of the base resin.

The above examples serve as particular illustrations of the invention disclosed, but are not intended as limitations thereon. Various techniques of subjecting these mixtures to irradiation with high-energy, ionizing radiations of the class disclosed herein, which are known to those familiar with this art, may be employed without departing from the scope of this invention. Similarly, it will be apparent to one skilled in the art, from the examples shown, that the present invention may be employed in the manner illustrated in the examples for other fluorocarbon copolymers within the generic class of fluorocarbon copolymers set forth hereinabove as being capable of cross-linking through irradiation.

Two substantial improvements in the properties of the fluorocarbon copolymers are obtained by the process of the present invention depending on the amount of irradiation the fluorocarbon copolymer is subjected to. Both improvements are the result of a change in the polymer structure; low exposure irradiation gives rise to substantial improvement in the fabricability of the copolymer and results from the broadened molecular weight distribution caused by the irradiation. The high temperature properties in fluorocarbon copolymers are, in part, limited by the ability of the copolymer to be fabricated into the desired shapes. Thus, in order to achieve fabricability through lowering of the melting point of the polymer, high temperature properties are sacrificed. The present invention, however, allows the fabrication of fluorocarbon copolymers of higher melting points and molecular weights and thereby increases the upper use temperature of fluorocarbon copolymers making them more valuable for high temperature industrial applications. In addition, the rheological behavior of the fluorocarbon copolymer is beneficially affected by the low exposure irradiation. Thus, at low shear stresses, as are prevalent in such methods of fabrication as vacuum forming, the irradiated copolymers exhibit lower shear rates than resins of similar molecular weight or melt viscosity. This prevents sag of the material during fabrication. At high shear stresses, the irradiated copolymers have higher shear rates than polymers directly synthesized to the same melt viscosity, which allows the copolymers to be more readily and rapidly fabricated in such operations as melt extrusions.

The second type of improvement is obtained through massive irradiation. This type of improvement is generally carried out on fabricated shapes, since these irradiated copolymers can not be further fabricated. The product obtained is a cross-linked fluorocarbon copolymer which exhibits elastomeric properties above its crystalline melting point. The major advantage of the cross-linked copolymer is its retention of physical shape and increased dimensional stability at elevated temperature, as well as its retention of mechanical properties at elevated temperatures. Thus, irradiated copolymers which are cross-linked are extremely useful in such applications as wire coatings, in the formation of extruded film or sheet, and when in funicular shape or the shape of a molded article.

I claim:
1. A process for irradiating a fluorocarbon copolymer of tetrafluoroethylene and an unsaturated fluoroolefin having general formulas of the class consisting of

$$CF_2=CXC_nF_{2n}Y$$

and

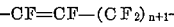

where X is of the class consisting of fluorine and perfluoroalkyl radicals, Y is of the class consisting of fluorine and hydrogen and $n$ is an integer from 1 to 10 inclusive, which comprises subjecting a composition consisting essentially of said copolymer to more than $1\times10^4$ rads of high energy, ionizing, radiation at a temperature above the glassy state transition temperature, but below the thermal decomposition temperature of the copolymer and recovering a fluorocarbon copolymer having decreased melt flow and increased molecular weight as determined by specific melt viscosity.

2. The process set forth in claim 1 wherein the radiation temperature is from 80 to 400° C.

3. The process set forth in claim 1 wherein the fluoroolefin is hexafluoropropylene.

4. The process as set forth in claim 1 wherein the fluoroolefin is perfluoroisobutylene.

5. The process as set forth in claim 1 wherein the fluoroolefin is perfluoroheptene-1.

6. The process of claim 1 wherein the irradiation is high energy electron irradiation.

7. The process of claim 1 wherein the irradiation is X-ray irradiation.

8. The process of irradiating a fluorocarbon copolymer of tetrafluoroethylene and a terminally unsaturated fluoroolefin having the general formula $$CF_2=CXC_nF_{2m}Y$$

wherein X is of the class consisting of fluoroalkyl and fluorine radicals, Y is of the class consisting of fluorine and hydrogen and $n$ is an integer from 1 to 10 inclusive, which comprises subjecting a composition consisting essentially of said copolymer to $1 \times 10^4$ to $2 \times 10^6$ rads of high energy, ionizing radiation at a temperature of 150° C. to 350° C., and recovering a copolymer of increased molecular weight, said irradiated copolymer having a melt viscosity of less than $100 \times 10^4$ poises.

9. The process of claim 8 wherein the fluoroolefin is hexafluoropropylene.

10. The process of irradiating a fluorocarbon copolymer of tetrafluoroethylene and a terminally unsaturated fluoroolefin having the general formula $$CF_2=CXC_nF_{2m}Y$$

wherein X is of the class consisting of fluoroalkyl and fluorine radicals, Y is of the class consisting of fluorine and hydrogen radicals and $n$ is an integer from 1 to 10 inclusive, which comprises subjecting a composition consisting essentially of said copolymer to greater than $2 \times 10^6$ rads of ionizing radiation at a temperature of 150° C. to 350° C. and recovering a cross-linked, non-melt flowable copolymer.

References Cited in the file of this patent

UNITED STATES PATENTS

| | | |
|---|---|---|
| 2,897,127 | Miller | July 28, 1959 |
| 2,921,006 | Schmitz et al. | Jan. 12, 1960 |
| 2,938,889 | Krespan | May 31, 1960 |
| 2,943,080 | Bro | June 28, 1960 |
| 2,946,763 | Bro et al. | July 26, 1960 |
| 2,961,389 | Hines et al. | Nov. 22, 1960 |

FOREIGN PATENTS

| | | |
|---|---|---|
| 740,899 | Great Britain | Nov. 23, 1955 |

OTHER REFERENCES

Dixon et al.: Industrial and Engineering Chemistry, vol. 49, pages 1687–90 (1957).

Bovey: "Effects of Ionizing Radiation on Natural and Synthetic High Polymers," page 155 (1958).

UNITED STATES PATENT OFFICE
CERTIFICATE OF CORRECTION

Patent No. 3,116,226                              December 31, 1963

George Henry Bowers III

It is hereby certified that error appears in the above numbered patent requiring correction and that the said Letters Patent should read as corrected below.

Column 2, line 39, after "which" insert -- the --; column 6, Table III, in the heading to the third column thereof, for "Irradiated" read -- Irradiation --; same table, in the heading to the fourth column thereof, for "(Irradiation Copolymer)" read -- (Irradiated Copolymer) --; column 7, about line 56, for "Table IV" read -- Table V --.

Signed and sealed this 2nd day of June 1964.

(SEAL)
Attest:

ERNEST W. SWIDER                               EDWARD J. BRENNER
Attesting Officer                                 Commissioner of Patents